United States Patent
Lammers et al.

(10) Patent No.: US 12,446,609 B2
(45) Date of Patent: Oct. 21, 2025

(54) PROCESS FOR ENCAPSULATING SOLID AND LIQUID ADDITIVES FOR FOODSTUFFS

(71) Applicant: Deutsches Institut für Lebensmitteltechnik e.V., Quakenbrück (DE)

(72) Inventors: Volker Lammers, Quakenbrück (DE); Aleksandar Pajic, Quakenbrück (DE); Matthias Rumker von Höven, Quakenbrück (DE); Carolin Bommes, Quakenbrück (DE)

(73) Assignee: Deutsches Institut für Lebensmitteltechnik e.V., Quakenbrück (DE)

( * ) Notice: Subject to any disclaimer, the term of this patent is extended or adjusted under 35 U.S.C. 154(b) by 838 days.

(21) Appl. No.: 17/503,824

(22) Filed: Oct. 18, 2021

(65) Prior Publication Data

US 2022/0117288 A1    Apr. 21, 2022

(30) Foreign Application Priority Data

Oct. 16, 2020  (DE) .......................... 102020213090.6

(51) Int. Cl.
*A23P 10/35* (2016.01)
*A23L 15/00* (2016.01)
*A23L 19/00* (2016.01)

(52) U.S. Cl.
CPC ............... *A23P 10/35* (2016.08); *A23L 15/20* (2016.08); *A23L 19/01* (2016.08); *A23V 2002/00* (2013.01)

(58) Field of Classification Search
None
See application file for complete search history.

(56) References Cited

U.S. PATENT DOCUMENTS

| 2011/0236557 A1* | 9/2011 | Suzuki .................... A23P 10/30 426/601 |
| 2014/0147501 A1* | 5/2014 | Van Lengerich ....... B29B 7/421 424/479 |
| 2014/0335259 A1 | 11/2014 | Vurma et al. |
| 2017/0231256 A1 | 8/2017 | Bindrich et al. |

FOREIGN PATENT DOCUMENTS

| DE | 102009014137 A1 | 9/2010 |
| EP | 0824000 A1 | 2/1998 |
| JP | 2003009837 A | 1/2003 |

OTHER PUBLICATIONS

Draheim, "Lipidextrusion—Prozessoptimierung für nadelförmige Arzneistoffe und Freisetzungsverhalten" (Dissertation), 2010.
Kühnen et al., "Extrusion zur Verkapselung von Wirkstoffen", Vitalstoffe, 2011, pp. 36-38, Coperion GmbH.

* cited by examiner

*Primary Examiner* — Erik Kashnikow
*Assistant Examiner* — Assaf Zilbering
(74) *Attorney, Agent, or Firm* — Greer, Burns & Crain, Ltd.; Steven P. Fallon

(57) ABSTRACT

A process for producing a fat-encapsulated ingredient. A fat is metered into an extruder, the fat having a melting point of at least 50° C. The fat is heated in in the extruder during rotation of at least one screw. At least one ingredient is metered into a barrel of the extruder to produce a flowable mixture. The flowable mixture is cooled in a a downstream adjacent section of the extruder barrel. The mixture is subsequently discharged through an extruder die. After discharge, the mixture is comminuted.

13 Claims, 2 Drawing Sheets

PROCESS FOR ENCAPSULATING SOLID AND LIQUID ADDITIVES FOR FOODSTUFFS

Figure 1:
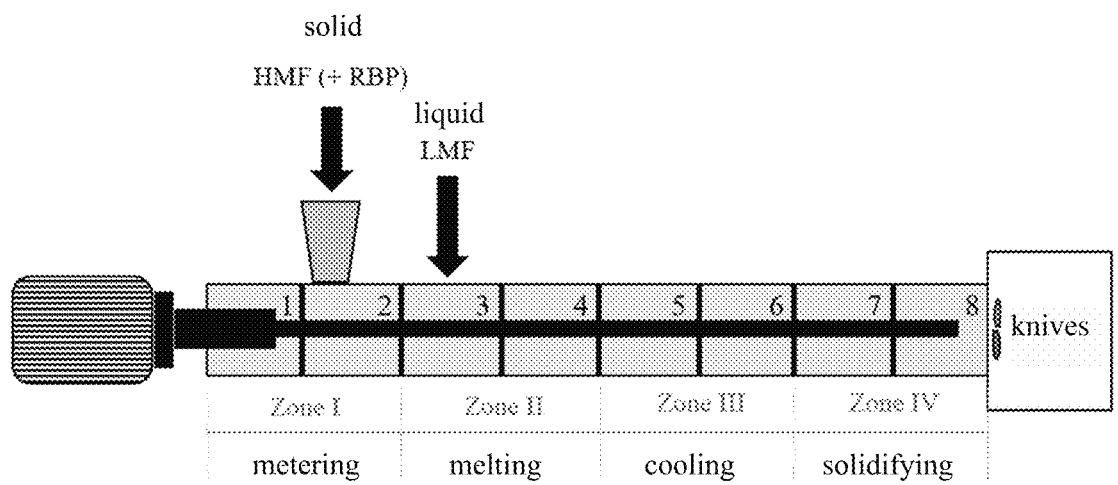

The present invention claims the priority of German patent application 10 2020 213 090.6, filed on 16 Oct. 2020.

The present invention relates to a process for encapsulating, in particular ingredients of foodstuffs and feedstuffs, e.g. ingredients and active components, in particular for use in foodstuffs and feedstuffs, wherein the ingredients are solid or liquid, in particular are solid or liquid at 20° C. to 40° C. or up to 38° C., and relates to encapsulated ingredients obtainable by the process for foodstuffs and feedstuffs. For the purposes of the invention, ingredients for foodstuffs also include minerals, e.g. silica, vitamins, plant-based ingredients, e.g. coloring plant extracts or powders, e.g. beetroot or parsley extract, edible charcoal, in particular charcoal produced from plants, microorganisms, these in each case optionally as powder, in solution, suspension or emulsion, liquid compounds and compositions, e.g. solutions and suspensions in water, in oil or in emulsion, which can e.g. be a water-in-oil emulsion or an oil-in-water emulsion, and mixtures of at least two of these.

The process is characterized in that in relation to the encapsulation material, a very high proportion of ingredients is encapsulated, and in that the process can be carried out with little machine effort. The obtainable encapsulated ingredients are characterized in that they have a low content of encapsulation material, are stable at room temperature, and without auxiliary agent are free-flowing and easy to dose. Optionally, the encapsulated ingredients are resistant to gastric juice, so that the ingredient is released from the encapsulation only after entry into the small intestine or during passage of the small intestine.

EP 3 052 571 B1 describes a temperature-stable water-in-oil emulsion suitable for foods, with a dye which is unstable at the pH value of the foodstuff at elevated temperature and which is contained in the aqueous phase, with an emulsifier in the continuous oil phase, wherein the aqueous phase is controlled to a pH value at which the dye is stable at the elevated temperature and the aqueous phase has an average droplet size of at most 1.5 µm in the oil phase.

Broker et al, Nature Protocols 2019 (https://doi.org/10.1038/s41596-018-0119-1) describe an in vitro test for the simulation of digestion.

The invention has the object to provide an alternative process for encapsulating powdered or liquid ingredients, and to provide alternatively encapsulated ingredients having a high proportion of the ingredients at a low proportion of the encapsulating material. Preferably, the process shall be simple to carry out and shall produce encapsulated ingredients that are free-flowing at room temperature, that are easy to dose, and that, after consumption, release the ingredients only after entry into the small intestine.

The invention achieves the object by the features of the claims and in particular provides a process for producing fat-encapsulated ingredient, the process comprising the steps of a) metering fat, which optionally is a fat mixture, having a melting point of at least 50° C., or at least 55° C., e.g. 50 to 90° C., preferably 55 to 70° C., more preferably at least 60 to 70° C., into an extruder, b) during rotation of the at least one screw of the extruder, heating the fat, e.g. to a temperature at which the fat is flowable, which temperature is e.g. 35 to 40 K above the melting temperature of the fat, e.g. at maximum 30 K or at maximum 25 K or at maximum 20 K or at maximum 10 K above the melting temperature of the fat, optionally to at maximum the melting temperature of the fat, to produce flowable fat, c) metering the ingredient into the extruder barrel, preferably downstream of the fat metering or at the same location as the fat metering, and mixing the ingredient with the fat in the extruder barrel to produce a flowable mixture containing or consisting of the fat and the ingredient, d) cooling the flowable mixture in the extruder to the melting temperature of the fat or below, such that e.g. a viscous but still flowable consistency is obtained, preferably by cooling the mixture to a temperature that is in a range of at least 1 K, at least 2 K, at least 3 K, at least 4 K or at least 5 K, preferably at least 10 K, more preferably at least 15 K, more preferably at least 20 K or at least 25 K or at least 30 K, e.g. 35 to 40 K below the melting temperature of the fat or mixture, e) immediately subsequently pressing or resp. extruding the mixture through an extruder die which e.g. has die openings having a diameter of 250 µm to 6 mm, more preferably 500 µm to 3 mm or up to 2 mm or up to 1 mm, to produce at least one extrudate strand, and, f) after discharge from the extruder die, comminuting the extrudate strand, e.g. by cutting, to produce pellets from the mixture, g) optionally subsequent drying of the pellets, e.g. until the surface is dry, preferably at a temperature below the melting temperature of the fat, h) optionally subsequent treatment of the pellets by temperature-controlling to a temperature of at least 2 to 10 K below the melting temperature of the fat and at least 50° C., preferably at least 55° C., more preferably at least 58° C., still more preferably at least 60° C., for at least 1 d, more preferably 3 to 10 d, e.g. 5 to 7 d, or consisting thereof.

Generally, in the process, at least during steps a), b), c), d) and e), the at least one screw of the extruder is rotated without interruption.

Optionally, after heating the fat, which is metered in step a) and e.g. has a melting point of at least 50° C., to at least its melting temperature in step b) and prior to cooling the flowable mixture in the extruder in step d), a low-melting fat is metered into the extruder. The low-melting fat is preferably metered in to at maximum 20 wt.-%, more preferably to at maximum 19 wt.-%, to at maximum 18 wt.-%, to at maximum 17 wt.-%, even more preferably to at maximum 16 wt.-% of the sum of the fats. Therein, the low-melting fat is e.g. metered to at least 5 wt.-% or at least 10 wt.-% or at least 12 wt.-% of the sum of the fats. The sum of the fats is the mass of the fat metered in step a), e.g. having a melting point of at least 50° C., and the low-melting fat. The low-melting fat has a melting point of at maximum 40° C., preferably of at maximum 39° C., of at maximum 38° C. or of at maximum 37° C., at maximum 36° C. or at maximum 35° C. Optionally, the low-melting fat can be one that is liquid at room temperature, such as non-hydrogenated plant-based oil.

The fat which is metered in step a), preferably is metered into the extruder as a solid, e.g. as powder or granules. The low-melting fat is preferably metered into the extruder as a liquid.

Currently, it is assumed that the ingredient is released in the small intestine by lipases only after passing through the stomach, because the melting temperature of the fat is higher than the body temperature of humans, farm animals and domestic animals. Therefore, the ingredient is preferably one that is unstable in gastric acid or that is affected or decomposed by gastric acid, and/or one that shall only to be released in the small intestine. Preferably, the pellets find use as foodstuff for humans or monogastric animals, in particular monogastric farm animals or domestic animals. When metering a low-melting fat into the extruder, pellets could be produced that contain the low-melting fat and yet release the ingredient only after a time and temperature equivalent to passage into the small intestine. It is believed that the low-melting fat accelerates the dissolution of the fat which is metered in step a) and e.g. has a melting point of at least 50° C.

It has shown that when a low-melting fat is metered in after step b) and prior to step d), a particulate mixture that is solid at room temperature is produced despite the content of low-melting fat. This particulate mixture, also referred to as pellets, is decomposed in the intestinal tract, particularly in the small intestine, of mammals and humans and releases the ingredient. It has shown that by choosing the type and proportion of low-melting fat, the release of the ingredient can be predetermined.

The mixing of fat having a melting point of at least 50° C. with the at least one ingredient can optionally occur prior to extrusion, e.g. for a proportion or all of the fat having the melting point of at least 50° C. and for the entire ingredient, e.g. in a mixer, which can be a powder mixer or an extruder, or the mixing can occur by simultaneously feeding the fat and the ingredient into the extruder in which the mixture is extruded. In particular in the embodiment in which the mixing of the fat with ingredient occurs in an extruder, the fat can have a temperature above its melting temperature or can have a temperature at or below its melting temperature. A mixer or extruder, in which the fat is mixed with ingredient, can be formed as an upstream section of the extruder in which the mixture is subsequently extruded. Accordingly, in the process, the steps a) and c), preferably a), b) and c), can be carried out simultaneously.

The fat metering in step a) of the fat that preferably has a melting point of at least 50° C., is preferably carried out at the inlet end of the extruder, optionally the metering of ingredient can be carried out in the area of the inlet end of the extruder or downstream thereof. Generally, the at least one screw of the extruder rotates continuously during the process, e.g. at the same or variable rotational speed.

Preferably, the heating of the mixture during extrusion is carried out by temperature-controlling the extruder in a first extruder section, e.g. by heating the extruder barrel and/or screw along a first extruder section, and by rotating the at least one screw of the extruder. Optionally, the first extruder section is not temperature-controlled, so that the heating of the mixture is predominantly or substantially exclusively by mechanical energy input from the extruder screw. The cooling following the generation of a flowable mixture is preferably carried out within the same extruder in a second extruder section and within an optional third extruder section, which e.g. immediately downstream adjoin the first extruder section. For the cooling, the second extruder section and the optional third extruder section are cooled, in particular the jacket and/or the screw along the second and/or third extruder sections. The second extruder section and/or the third extruder section can e.g. be cooled to 10° C. to 0° C., e.g. to a temperature of up to 70 K, of up to 35 K, of up to 30 K, of up to 25 K, or up to 20 K below the melting temperature of the fat that was metered in step a), preferably below the melting temperature of the flowable mixture.

Preferably, the cooling of the second extruder section is carried out in counter-current to the conveying direction of the extruder. Optionally, the second and/or the third extruder section can be cooled in order to bring the mixture to a temperature which is at maximum 35 K, at maximum 30 K, at maximum 25 K or at maximum 20 K below the melting temperature of the flowable mixture or below the melting temperature of the fat metered in step a), following the discharge from the extruder die. This is because it has shown that even at a temperature below the melting temperature, the mixture is forced through the die by means of the extruder and is solid immediately subsequently. Preferably, the comminution occurs immediately after discharge of the mixture from the die.

The mixture produced by the process, which mixture contains or consists of the fat metered in step a) and the ingredient, optionally low-melting fat, is also referred to as the fat-encapsulated ingredient, and can also be referred to as a fat capsule.

Generally, the melting temperature of the flowable mixture can be the melting temperature of the fat metered in step a), particularly for the purposes of temperature control in the process. The melting temperature of fat or of the mixture is determined from the melting range determined by means of differential scanning calorimetry (DSC). Accordingly, preferably the melting temperature is the melting range determined by means of DSC.

The comminuting of the mixture occurs immediately after discharge of the mixture from the extruder, wherein the temperature to which the mixture has been cooled sets a viscosity that allows for the passage through a forming unit, e.g. from a die plate, preferably in combination with a cutting device. The cutting device can e.g. comprise rotating knives, e.g. 2 to 6 knives, running at 100 to 1500 rpm downstream adjacent to the extruder die, which e.g. is a die plate.

Since the temperature, to which the mixture has been cooled when it discharges from the extruder die, is lower than the melting temperature of the fat or mixture by a maximum of 1 to 50 K, e.g. up to 40 K or up to 30 K, e.g. by 5 to 25 K or 10 to 20 K, the mixture solidifies after passing through the forming unit already without or with little further cooling. The flowability of the mixture even at a temperature below its melting temperature, e.g. by 20 K or 10 K to 1 K below its melting temperature, is presently attributed to the fact that the mixture is pressurized and continuously sheared in the extruder. Accordingly, it is generally preferred that the mixture is continuously sheared in the extruder, e.g. by continuous rotation of the screw. The mixture discharged from the extruder solidifies immediately and, particularly after the comminution, forms pieces, which herein are also referred to as pellets and which are pourable or free-flowing at a temperature below the melting temperature of the fat and which are therefore easy to dose and mix into foodstuff. The pellets comprise or consist of the mixture of the ingredient encapsulated by fat.

During the optional step h), treating the pellets by temperature-controlling, it can be temperature-controlled to a temperature lying at least 2 to 10 K below the melting temperature of the fat, which has a melting point of at least 50° C. or at least 55° C., e.g. 50 to 90° C., preferably from 55 to 70° C., more preferably at least 60 to 70° C.

The process has the advantage of producing a product in the form of pellets having a high loading of ingredient, e.g. for solid ingredient, represented by finely divided plant-based charcoal, powdered egg yolk, or liquid ingredient, e.g. liquid egg yolk or an aqueous mixture or emulsion of a plant extract, e.g. of beetroot or parsley, a content of at least 5 wt.-%, at least 10 wt.-%, at least 20 wt.-%, at least 30 wt.-%, at least 40 wt.-% or at least 50 wt.-%, e.g. up to 60 wt.-%, balance fat.

When mixing at least a portion of the fat metered in step a) with the ingredient before they are metered into the extruder, the fat is liquid, preferably powdery, and the ingredient is powdery or liquid.

Generally, the fat and the ingredients are suitable for human or animal consumption, in particular suitable for food, and preferably of natural origin. The fat can consist of only one compound or of a mixture of at least two compounds. Preferably, the fat is of plant-based origin. The fat can be free fatty acid, optionally as salt, mono-fatty acid glyceride, di-fatty acid glyceride and/or tri-fatty acid glyceride and/or wax, or can be a mixture of at least two of these, preferably saturated. The free fatty acid, which is preferably saturated, or its salt can have a chain length of e.g. 10 to 24 C atoms, e.g. 12 to 18 C atoms, wax can consist of at least one $C_6$ to $C_{16}$ fatty acid, esterified with at least one $C_2$- to $C_4$-alcohol.

A preferred fat metered in step a) comprises or consists of plant-based fat hardened by hydrogenation, e.g. hardened coconut fat, hardened palm fat, hardened canola fat, hardened animal fat, or a mixture of at least two of these. The hardened animal fat is preferably hydrogenated fish oil.

Fat that is metered in step a) preferably has a melting range of 60 to 90° C., more preferably 60 to 70° C., and is hardened by complete hydrogenation, e.g. canola oil, beet oil, sunflower oil, palm oil, palm kernel fat, palm kernel oil, castor oil, corn germ oil, peanut oil, soybean oil, wheat germ oil, olive oil, fish oil, milk fat, each completely hydrogenated, or a mixture of at least two of these.

The low-melting fat is not hydrogenated and can be monounsaturated or polyunsaturated, e.g. coconut fat, palm kernel fat, palm fat, milk fat, vegetable oil, e.g. canola oil, olive oil, linseed oil, sunflower oil, hemp oil, peanut oil, walnut oil, wheat germ oil, palm oil, palm kernel oil, safflower oil, sesame oil, cottonseed oil, or a mixture of at least two of these.

The treatment of the pellets by temperature-controlling to a temperature of at least 2 to 10 K below the melting temperature of the fat metered in step a), and at least 50° C. in step h), can be carried out directly after step f), or after steps f) and g). Preferably, prior to step h), the pellets are filled into packages which are preferably airtight, e.g. elastic bags of plastic. The treatment of the pellets in step h) results in a significant reduction of the microbial content, especially of bacteria. Surprisingly, it has shown that this treatment results in in the reduction of the microbial content, while the shape and the quality of the pellets remain essentially unchanged. The quality or biological activity of the ingredient contained in the pellets also remained essentially unchanged by this treatment.

The ingredient can consist of one substance or of a mixture of at least two substances. The ingredient can be solid or liquid at the melting temperature of the fat metered in step a), preferably at the temperature to which is maximally heated during the process, e.g. in step b), and the ingredient can be a solution, e.g. in water and/or ethanol, or a suspension or emulsion. An emulsion or a suspension can be liquid or solid at room temperature or at the melting temperature of the fat, and can be miscible with water. An emulsion or a suspension can comprise at least one substance dispersed in a second fat, optionally with an emulsifier, which second fat has a lower melting point than the fat used for encapsulation. Preferably, the ingredient is free of organic solvents, except ethanol. For an ingredient that is solid at the melting temperature of the fat, it is preferred that it has a particle size in the product of at maximum 500 µm or at maximum 50 µm, e.g. a particle size of 50 to 500 µm. Therein, the ingredient can already have this particle size when mixing with the fat, or the ingredient has a larger particle size at mixing with the fat and is comminuted when passing through the extruder. Preferably, the ingredient prior to mixing has a particle size that is smaller than the diameter of the die orifices of the die connected to the extruder.

The extruder can have exactly one screw or can have two or more screws, e.g. can be a twin screw extruder or planetary roller extruder. Optionally, the extruder has a section arranged at the inlet end, which section is set up to comminute solids, e.g. with a smaller gap between the screw and the stator than in an adjacent first section and/or than in the second section adjacent thereto.

Optionally, the extruder has a section formed as a planetary roller extruder, e.g. as a section arranged at the inlet end, which section is set up for comminuting solids, as a first section and/or as a second section. The planetary roller extruder has the advantage of very precise temperature control with low energy input, which can be advantageous for ingredients sensitive to temperature and shearing.

The invention is now described in more detail with reference to examples and with reference to the figures, which show in FIG. 1 schematically an extruder preferably used in the process, FIG. 2 the release over time of beetroot powder encapsulated according to the invention, and in FIG. 3 the entire release of beetroot powder encapsulated according to the invention.

EXAMPLE 1: PRODUCTION OF AN INGREDIENT ENCAPSULATED BY FAT

Plant-based charcoal, which was preferably ground and finely divided, was used as the ingredient. This powdery plant-based charcoal was mixed by stirring at room temperature with powdery hardened canola oil as fat, melting temperature 65-70° C., to form a powder mixture of 50 wt.-% each of fat and ingredient. This powder mixture was fed into the inlet end of a twin-screw extruder (Type 44, Bühler AG), the first stator section of which, subsequent to the inlet end, had a double jacket which was temperature-controlled by temperature control medium having a temperature of 57° C., and the downstream adjacent second stator section of which extruder had a double jacket which was temperature-controlled by temperature control medium having a temperature of 35° C. for the cooling. As temperature control medium, 1:1 glycol:water was used. The temperature-controlling of the first stator section by temperature control medium, with the energy introduced by the rotation of the screws, was sufficient to melt the fat, so that an optically homogeneous mixture was formed. The second stator section temperature-controlled for cooling by temperature control medium having a temperature of 35° C., i.e. below the melting temperature, at the conveying rate of 23.7 kg/h resulted in cooling of the flowable mixture to a temperature of 41.9° C., measured immediately after discharge of the mixture, so that the mixture in the extruder was flowable and highly viscous. The outlet end of the second stator section was covered by a perforated plate as a die, 4 holes of 2.6 mm diameter, along the outlet side of which knives were guided rotatingly that cut the discharging mixture into pellets. At room temperature, the pellets were solid and had a uniform, closed surface.

The pellets could also be readily made from 60 wt.-% of the plant-based charcoal and 40 wt.-% of the fat.

EXAMPLE 2: PRODUCTION OF AN INGREDIENT ENCAPSULATED BY FAT

As ingredient, egg yolk powder was used, which was mixed at room temperature in batches with hardened plant-based fat, melting temperature 65-70° C., at 50 wt.-% each to form a powder mixture. This premix was metered into the inlet end of a twin screw extruder (Type 44, Bühler). The extruder barrel was temperature-controlled to 70° C. in a first section adjacent to the inlet end, to 30° C. in an adjacent second section, and to 5° C. in a third section adjacent to the die. Therein, the temperature control medium (1:1 glycol:water) in the first and second sections flowed in co-current with the conveying direction of the extruder, and in the third section flowed in counter-current. The metered premix liquefied in the first section during rotation of the screws (approx. 100 rpm). The extrudate strands discharging from the die plate had a temperature of approx. 30° C. and were cut into pellets by means of rotating knives. It is assumed that the rotation of the screws and the resulting pressure of 14.7 bar measured in the extruder were sufficient to keep the mixture sufficiently malleable or flowable to be conveyed through the die even at a temperature of the mixture below the melting temperature of the fat.

Alternatively, the egg yolk powder was mixed at 60 wt.-% with 40 wt.-% of the fat (melting point 65-70° C.) to form a powdery premix. The first section of the extruder adjacent to the inlet port was temperature-controlled to 60° C., the downstream adjacent second section was temperature-controlled to 25° C., and the adjacent third section, to which the extruder die plate is adjacent, was temperature-controlled to 0° C. In the first and second sections, the temperature control medium flowed in co-current with the conveying direction of the extruder, and in the third section flowed in counter-current. Optionally, between the first section and the inlet end, an additional extruder section was arranged which was not temperature-controlled. This additional extruder section does not appear to have any significant effect. Immediately after discharging from the die plate, a temperature of 24.3° C. was measured for the extrudate strands from the compound, approx. 40 to 45 K below the melting temperature of the fat. The pressure in the extruder was approx. 16 to 17 bar.

The respective pellet-shaped product made of dry egg yolk encapsulated in the fat was stable against moisture and pourable.

EXAMPLE 3: PRODUCTION OF A LIQUID INGREDIENT ENCAPSULATED BY FAT

As an example of a water-miscible liquid ingredient, a water-miscible emulsion of beetroot that was prepared according to EP 3 052 571 B1 was used. 56 wt.-% beetroot powder was admixed in water at 60° C., the pH of this aqueous phase was set to 4.4, the oil phase was mixed from sunflower oil containing 0.3 wt.-% lysophosphatidylcholine, 1.85 wt.-% phosphatidylcholine, 1.0 wt.-% phosphatidylethanolamine, 0.3 wt.-% phosphoinositol (collectively referred to as E322), 0.7 wt.-% polyglycerol polyricinoleate (E476) and 2.5 wt.-% citric acid ester of edible fatty acids (E472c), with subsequent temperature-controlling of the aqueous phase with the oil phase to 45° C. and mixing at a weight ratio aqueous phase:oil phase of 70:30, dispersing to the pre-emulsion by means of a rotor-stator system at 500 to 800 rpm, with subsequent fine dispersion by an Ultra-Turrax at 22000 rpm for 2 min and/or by a high-pressure homogenizer in two stages at 80 to 200 bar/50 bar.

The extruder of Example 2 was temperature-controlled to 70° C. in the first section, to 37° C. in the second section and to 20° C. in the third section, wherein the temperature control medium flowed through the double barrel of the extruder barrel in co-current in the first and second extruder sections, and in counter-current to the conveying direction of the extruder (rate of rotation 100 rpm) in the third extruder section. The fat, melting temperature 65-70° C., as a powder or in lumps was metered into the inlet end at the first section of the extruder at 30 kg/h. The ingredient in the form of the water-miscible emulsion was continuously pumped in at a metering port downstream of the inlet end in the first section of the extruder at a rate of 7.7 kg/h. A pressure of 11.3 bar was measured inside of the extruder, the temperature of the mixture after discharge from the die plate was 31° C. The extrudate strands of the mixture discharging from the die plate were cut into pellets by the rotating cutting blade.

The extruder was closed except for the inlet and the outlet connected to the die plate, so that no water could emerge from the mixture or from the liquid ingredient during the process. The pellets exhibited the dark purple color characteristic of beet root, were pourable and externally dry.

This example shows that the process is also suitable for producing encapsulated ingredients which are liquid at room temperature and miscible with water, or resp. which are aqueous and liquid at room temperature.

EXAMPLE 4: PREPARATION OF A LIQUID INGREDIENT ENCAPSULATED BY FAT

Liquid egg yolk was used as an example of a liquid ingredient, plant-based fat (melting temperature 65-70° C.) was used as fat. The twin-screw extruder (Type 44, Buhler) was temperature-controlled to 60° C. in a first section adjacent to the inlet end, to 10° C. in the downstream adjacent second section, and to 0° C. in the third section downstream adjacent thereto. In the first and second sections, the temperature control medium flowed in the same direction as the conveying direction of the extruder, in the third section, the temperature control medium flowed in counter-current to the conveying direction of the extruder. Between the inlet end and the first section of the extruder, optionally a non-temperature-controlled extruder section was arranged. The fat was metered into the inlet end at room temperature as a solid, powdery or lumpy, at 30 kg/h. The liquid egg yolk was continuously metered through a connecting port into the second section of the extruder at 10.5 kg/h by means of an eccentric screw pump. The screws were driven at 100 rpm.

The mixture discharging from the die plate as an extrudate strand was visually homogeneous and had a temperature of approx. 19-20° C. and thereby of about 45 to 50 K below the melting temperature of the fat. A pressure of approx. 11 bar was measured in the extruder.

This example shows that the process is suitable for producing fat-encapsulated liquid ingredients that are miscible with water. Furthermore, this example shows that the process is suitable for producing fat-encapsulated liquid ingredients that are miscible with liquid fat, in this case because of the effect of the egg yolk, or its phospholipids, as an emulsifier.

Optionally, subsequently the pellets were post-dried at room temperature until they were superficially dry.

Preferably, pellets, especially if they contained solid or liquid egg product as an ingredient, were filled into airtight plastic bags as packaging and were treated by temperature-controlling for 3 to 7 d (days) to 50 to 60° C., especially to 58° C. Therein, the fat had a higher melting temperature, e.g. of about 65-70° C.

EXAMPLE 5: PRODUCTION OF AN INGREDIENT ENCAPSULATED WITH FAT AND LOW-MELTING FAT

As ingredient, 10 wt.-% beetroot powder was extruded with 90% fat that consisted of hydrogenated canola oil (melting point 65-70° C.) and a low-melting fat. As low-melting fat, canola oil (liquid at a room temperature of 20° C.), palm kernel fat (melting point 22 to 26° C.) or coconut fat (melting point 23 to 26° C., or 22 to 26° C.) was metered in at 6, 12 or 16 wt.-% in relation to the sum of hydrogenated canola oil and low-melting fat.

For the extrusion, an extruder was used which was temperature-controlled to different temperatures in 4 zones as shown in FIG. 1. The extruder barrel was composed of 8 segments, and the screw extended along the entire length of the barrel. At the inlet end (zone I), the hydrogenated canola oil (HMF) was metered as a powder into the extruder at 25 to 40 kg/h, e.g. 35 kg/h, the second section (zone II) was temperature-controlled to above the melting temperature of the hydrogenated canola oil, the low-melting fat (LMF) was temperature-controlled to 40 to 45° C. and was metered in liquid form into the second section by means of a metering pump (2.3 to 6.8 kg/h), the third section (zone III) and the fourth section (zone IV) were temperature-controlled to 0° C. in order to cool the mass to a temperature of approx. 17 to 28° C., measured immediately at the extruder outlet, and to immediately subsequently press the mass through a die plate having openings of 2 mm diameter, alternatively 0.5 or 1 mm diameter, and to cut the discharging solid strands with a rotating knife. The beetroot powder (RBP) was metered into the inlet end with the hydrogenated canola oil, or separately into the first section.

The screw was driven to 100 rpm, and the rotating knife had 6 blades rotating at 1200 rpm.

The mixture discharged from the die plate was solid, could be cut into dimensionally stable pellets, and required no further cooling, but was dimensionally stable at room temperature.

Prior to starting the in vitro digestion, 14 g of pellets were rinsed with distilled water for 2 min to rinse off beetroot powder present on the surface and thus to be able to determine the encapsulation efficiency in terms of release of beetroot powder from pellets by means of photometric determination. The in vitro test was carried out following Brodkorb et al, Nature Protocols 2019. The in vitro test initially includes a 3 minute oral phase in which the previously rinsed 14 g pellets are incubated with 14 mL of synthetic saliva at pH 7 (SSF) in the reactor of the semi-dynamic titration device at 37° C. For the initiation of the gastric phase, 17 mL of synthetic gastric juice having pH 3, as well as pepsin dissolved in 3 mL of SGF having pH 4.5, are added to the oral mixture and are incubated for 2 h at 37° C. After the end of the gastric phase, 20 mL of the gastric mixture (half of the particles and half of the liquid) are mixed with 17 mL of synthetic intestinal fluid (SDF) having pH 7, as well as with pancreatin dissolved in 3 mL of SDF, and bile salts (CAS No. 8008-63-7, product No. SC-214601, available from Santa Cruz Biotechnology, Heidelberg) and are incubated for 2 h at 37° C. The pH value during semi-dynamic digestion is computer-controlled by the addition of acid and base in the oral phase to pH 7, in the gastric phase to pH 3.2 for 10 min, to pH 2.8 for 20 min, to pH 1.8 for 40 min, to pH 1.7 for 60 min, and to pH 1.5 for 120 min, and during the intestinal phase to pH 6.5 for 120 min. Switching between the individual digestive phases is carried out manually.

The release of the ingredient, represented by the beetroot powder, was determined in in vitro tests following surface washing of pellets to remove loose powder. The release was determined photometrically in the free solution.

Figure 2:
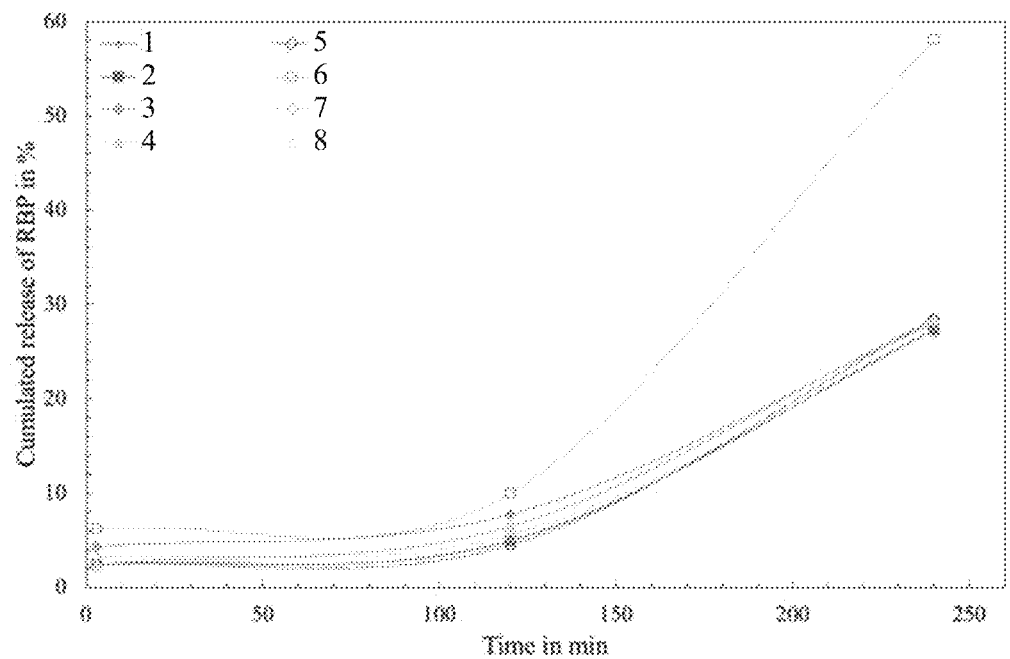
Figure 3:
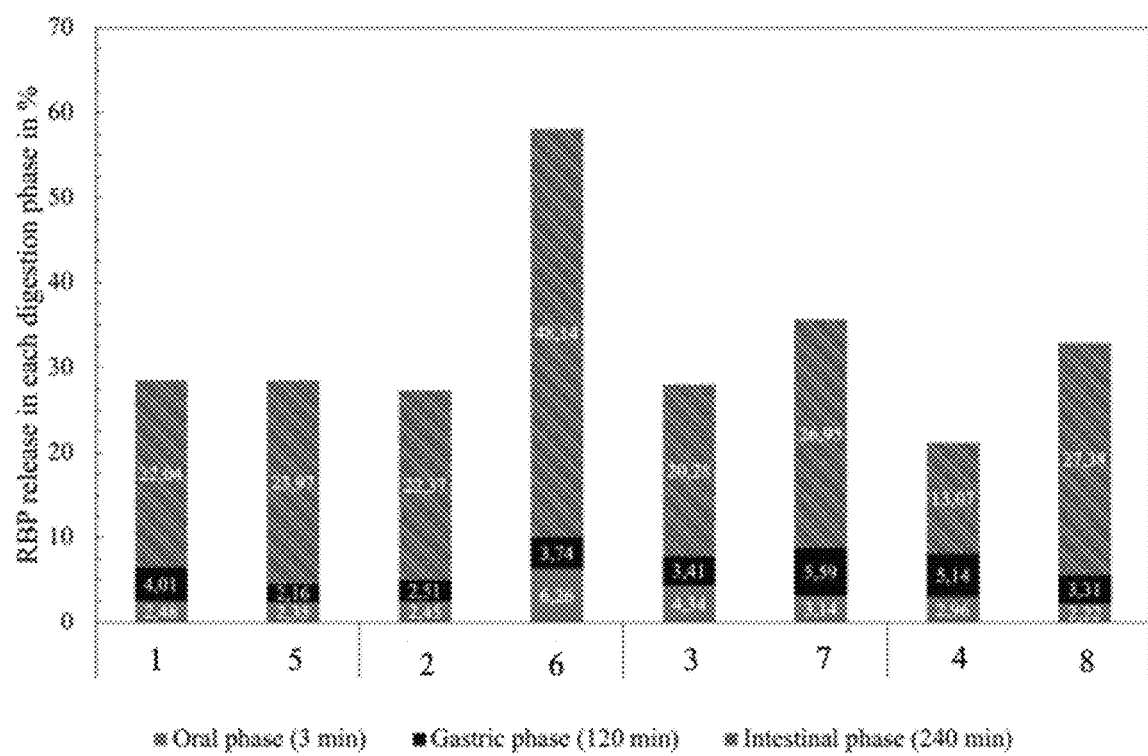

FIG. 2 shows the release of the model ingredient beetroot for 12% canola oil (1), 12% palm kernel fat (2), 12% coconut fat having a melting point 22-26° C. (3), 12% coconut fat having a melting point 23-26° C. (4), 16% canola oil (5), 16% palm kernel fat (6), 16% coconut fat having a melting point 22-26° C. (7), 16% coconut fat having a melting point 24-26° C. (8) is shown in FIG. 2 over the time of the in vitro digestion, FIG. 3 shows the total release following the in vitro digestion.

This result shows that the pellets result in a delayed release of the majority of the ingredient of up to 48% in the intestinal phase (resorption site), while in the oral and gastric phases they show a low release or resp. are stable and protect the encapsulated component from acidic gastric juice.

The fat mixture comprising 16% low-melting palm kernel fat is particularly advantageous, as the amount of released beetroot powder in the intestinal phase is almost twice as high compared to fat capsules comprising canola oil or one of the coconut fats. Also, the pellets comprising palm kernel fat have been found to have a good stability and good protection during the oral and gastric phases.

Overall, the results show that pellets produced according to the invention from ingredient encapsulated by fat, especially having a portion of low-melting fat, allow for a targeted release of the ingredient in the small intestine.

The invention claimed is:

1. A process for producing fat encapsulated ingredient, the process comprising the steps of
   a) metering of fat having a melting point of at least 50° C. into an extruder,
   b) heating the fat to at least the melting temperature of the fat in the extruder during rotation of the at least one screw,
   c) metering at least one ingredient into the extruder barrel to produce a flowable mixture,
   d) cooling the flowable mixture in a downstream adjacent section of the extruder barrel to a temperature lying in a range of at least 10 K below the melting temperature of the mixture,
   e) subsequently discharging the mixture through an extruder die,
   f) comminuting the mixture after discharge from the extruder die to produce pellets from the mixture.

2. The process according to claim 1, comprising comminuting the ingredient in a section of an extruder which is arranged at the inlet end and which is set up for comminuting solids, and mixing the fat with the ingredient, extruding the mixture with heating, and subsequently cooling the flowable mixture in a common extruder.

3. The process according to claim 1, wherein prior to metering the fat into the extruder, the ingredient is mixed with the fat, and a mixture containing the fat and the ingredient is metered into the extruder.

4. The process according to claim 1, wherein after heating the fat, which has a melting point of at least 50° C., to at least its melting temperature in step b), and prior to the cooling of step d), additionally a low-melting fat, which has a melting point of maximally 40° C., is metered into the extruder to maximally 20 wt.-% of the fats.

5. The process according to claim 1, wherein in step d) the cooling is carried out until the mixture, after discharging from the extruder die, has a temperature lying in the range of 50 K to 10 K below the melting temperature of the mixture.

6. The process according to claim 1, wherein the pellets subsequent to step f) are treated by h) temperature-controlling for at least 1 d to a temperature of at least 2 to 10 K below the melting temperature of the fat and at least 50° C.

7. The process according to claim 6, wherein the pellets are filled into airtight packages prior to the temperature-controlling in step h).

8. The process according to claim 1, wherein the mixture of the fat-encapsulated ingredient contains at least 5 wt.-% ingredient.

9. The process according to claim 1, wherein the fat is hydrogenated plant-based fat, hydrogenated animal fat or a mixture of at least two of these, which has a melting temperature of at least 40° C.

10. The process according to claim 1, wherein the ingredient is solid at the temperature to which the mixture is heated in step b).

11. The process according to claim 1, wherein the ingredient is liquid at the temperature to which the fat or the mixture is heated.

12. The process according to claim 1, wherein the ingredient is a solid or a water-miscible solution, liquid emulsion, or a suspension.

13. The process according to claim 1, wherein the fat consists of at least one hydrogenated plant-based fat.

\* \* \* \* \*